Dec. 11, 1928.   S. W. RUSHMORE   1,694,518
ENGINE LUBRICATING SYSTEM
Filed Oct. 9, 1924
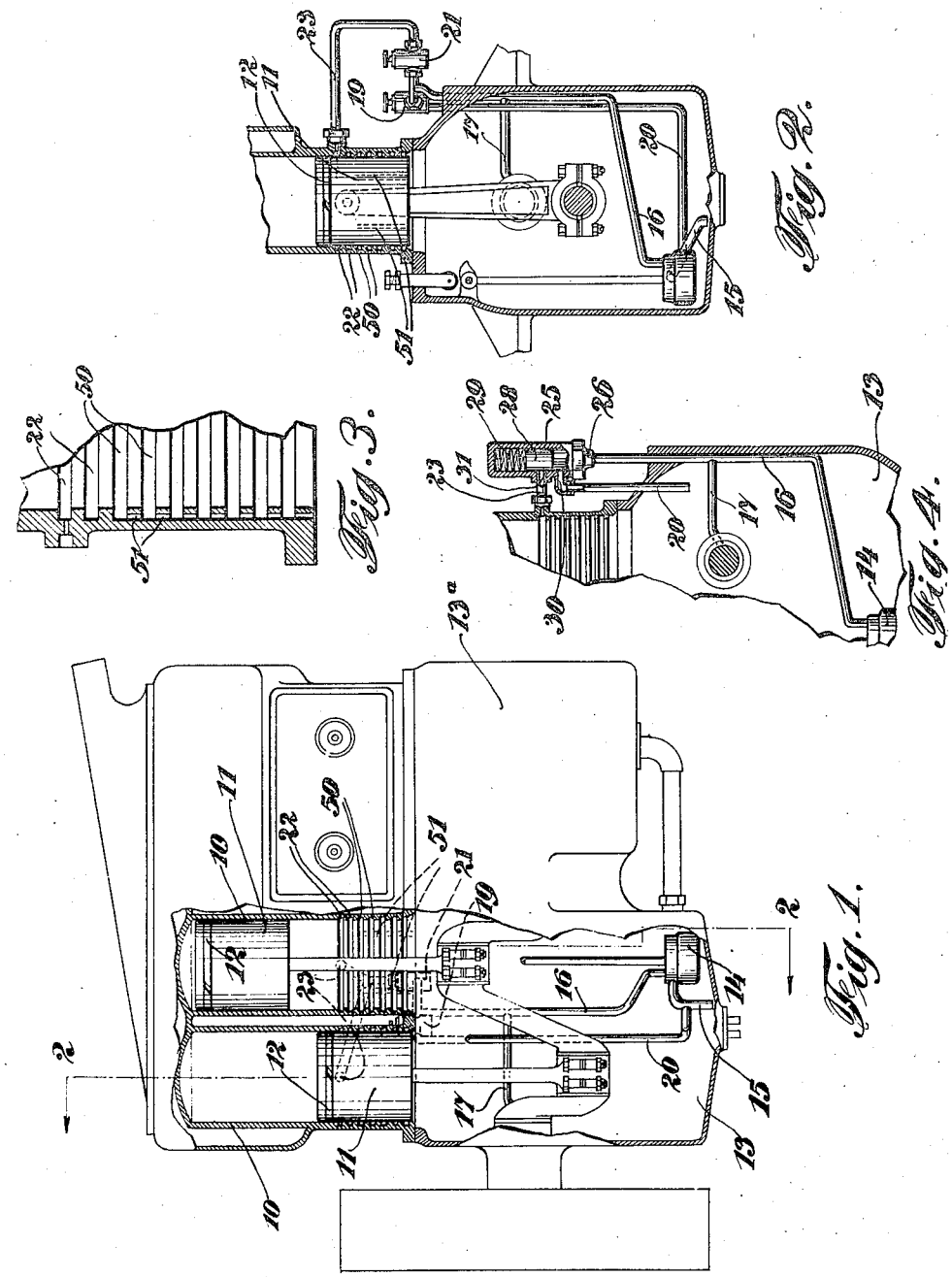
INVENTOR
Samuel W. Rushmore
BY
George C. Dean
ATTORNEY Patented Dec. 11, 1928.

1,694,518

UNITED STATES PATENT OFFICE.

SAMUEL W. RUSHMORE, OF PLAINFIELD, NEW JERSEY.

ENGINE-LUBRICATING SYSTEM.

Application filed October 9, 1924. Serial No. 742,636.

My present invention concerns correct lubrication of the pistons of internal combustion engines by ensuring an ample supply of oil at all times, while also preventing excess flow of oil into the combustion chambers.

One of the principal difficulties encountered in connection with pressure feed lubricating systems is to ensure a proper supply of lubricant to the pistons at the time a cold engine is started. If the oil is cold it will not reach the piston for several minutes after the engine has been started because it takes so long for the oil to become sufficiently warm to flow freely through the oil ducts and deliver the supply to be splashed by the crank in the usual way. This failure of oil supply upon starting the engine has a very destructive effect on the pistons and they soon become scored or scuffed. A contributing factor to this undesirable effect is the fact that when a cold engine is started, the choke on the air intake of the carburetor is usually operated and the combustion chambers are to some extent flooded and flushed with cold liquid gasoline which washes away such small amount of lubricant as may be on the cylinder and piston walls.

Because of the high viscosity and sluggishness of ordinary cylinder oil when very cold, the oil pump of the average pressure feed system will build up an excessive pressure but one feature of my present invention, involves utilizing said excessive pressure to supply oil directly to the walls of the cylinder as soon as the engine is started, preferably through one or more circumferential grooves in the cylinder wall, preferably just below the lowest point swept by the upper piston ring.

The usual oil feed pump normally operates at say, fifteen pounds pressure, the system being usually equipped with a pressure relief valve opening at about this pressure and by-passing excess oil directly back to the sump in the bottom of the crank case. When the oil is too cold, or is too viscous for any other reason, the flow resistance in the return pipe causes excessive back pressure much greater than eight pounds and this excessive pressure I utilize by employing a supplemental pressure relief valve set for a somewhat higher pressure than the standard relief valve, opening of which supplemental valve releases the high pressure oil into an oil duct which leads directly to the cylinder walls. By virtue of this construction these initial high oil pump pressures may be used for delivering desired large quantities of the oil past this supplemental relief valve and directly to the cylinders which are then in great need of lubricant. In this way, oil reaches the cylinders long before it becomes sufficiently warm to flow freely through the crank shaft bearings to lubricate the cylinders by splash from such bearings.

The use of such supplemental valve can in no way affect normal operation of the system after the oil has become warmed up because its viscosity and flow resistance then become too small to keep up the back pressure required to keep open the supplemental valve, which then closes automatically, leaving the lubricating system to operate in the regular way until the back pressure again becomes sufficient to open the supplemental valve. It is to be noted that the setting of these valves and the design of the oil pump may be such that excess pressures and opening of the supplemental valve will result merely from excessively high speed of the engine, even when the oil is hot, but at such speeds the excess lubricant for the pistons is highly desirable.

In accordance with another embodiment of the invention, I modify the construction of the ordinary pressure relief valve of a pressure feed system so that it will serve the additional purposes of releasing oil to the cylinder by further movement in response to further increase of oil pressures, after it has already served its purpose of opening the by pass return to the sump. Other systems of valving might be resorted to, the object being to supply a quantity of lubricating fluid directly to the cylinder walls for effecting lubrication thereof from the time the engine is started until the time that the splash from the crank and connecting rod bearings becomes operable.

As it is desirable that my supplemental or emergency oil supply be copious, I provide novel means for preventing excess oil from gaining access to the combustion chamber, either from such emergency supply or during subsequent normal operation of the regular oiling system. This is preferably accomplished by providing a succession of grooves in the cylinder walls just below the oil supply, which latter is just below the lowest point swept by the piston ring or rings. That is to say one or more of the upper grooves is preferably isolated in order to retain a certain amount of oil, while the remaining lower grooves of the series are drained through passages leading back to the crank case. With such grooves I prefer to employ a single piston ring of only sufficient tension to prevent downward passage of high pressure gases.

I have discovered that the usual theory concerning the effectiveness of piston rings to prevent leakage of oil into the combustion chamber is erroneous. Piston rings in spite of the fact that they are of the best makes and very accurately fitted into the piston ring grooves, are inoperative to prevent the passage of oil upwardly past the piston since the oil passes by a pumping action around the rings and the rings serve no real purpose except the sealing of high pressure gases in the combustion chamber. By using merely a single piston ring I greatly minimize the friction between the piston and cylinder and by virtue of a novel cylinder construction to be later described, I am able to minimize the tension of the lubricating film between piston and cylinder and to a large extent overcome the leakage of oil into the combustion chamber.

The various features of the invention will be better understood from the following description in connection with the accompanying drawings, wherein:

Fig. 1 is a view mainly in section and partly in side elevation of an engine embodying the invention.

Fig. 2 is a transverse sectional view on the line 2—2 of Fig. 1.

Fig. 3 is a sectional detail of the interior of a cylinder.

Fig. 4 is a sectional detail view illustrating a modification.

Referring to Figure 1 of the drawings, reference characters 10 indicate the cylinders of an internal combustion engine in which power pistons 11 are slidable. For reasons explained above each piston is preferably provided with only one piston ring 12.

The usual feed pump 14 of the lubricating system has an intake pipe 15 from the oil sump 13 in the bottom of the crank case 13ª the pump delivering oil to main supply pipe 16. Flexible pipe leads 17 may be taken off to the crank, connecting rod and cam shaft bearings in a conventional manner. The usual pressure relief valve 19 is provided in the supply pipe and under ordinary conditions is set for a pressure of approximately 15 pounds. This relief valve opens to by-pass oil back to the sump through a pipe line 20 whenever such pressure is exceeded. In carrying out my invention I provide supplemental pressure relief valve 21, set for operation at a higher pressure, say 30 pounds, controlling an oil duct 23, which leads directly to annular grooves 22 in the cylinder walls. When the cold engine is started, the pressure very rapidly builds up in the supply pipe, the flow resistance and back pressure of the cold oil opposing the pump pressure, thereby quickly raising the pressure to a point where it will operate the supplemental relief valve and supply lubricant to the cylinders through the pipe 23. As soon as the oil has become warmed up sufficiently to flow freely, it lubricates the cylinder walls by splash from the crank and connecting rod bearings. Such free flow of the oil also decreases the pressure on the valve 21 and it automatically closes, thus cutting off the emergency oil supply, when it is no longer required.

In Figure 4 of the drawings, I have illustrated a slightly modified form of construction in which a single relief valve controls the by-pass to the sump and the by-pass to the cylinder. In this instance the cylindrical valve casing 25 is directly connected through its open end 26 to the reservoir pipe 16, and a piston valve 28 sliding in the casing is opposed by a coiled spring 29. As pressure is built up in the supply pipe, the piston valve will be forced upward within the casing against the action of the spring, uncovering successively the by-pass passage 30, leading back to the sump, and then by-pass 31 leading to the cylinders. Upon the initiation of engine operation sufficient pressure will be readily built up for moving the valve to uncover both by-pass passages while in normal operation the pressure will be reduced so that the by-pass to the cylinder is sealed by the plunger valve; and at still lower pressure both valves will be closed.

The series of grooves in the cylinder wall starts just below the lowest point swept by the piston ring. One or more of the upper grooves 22 of this series are without drainage and preferably the uppermost groove serves as an annular supply chamber into which oil is delivered by the pipe 23. The remaining lower grooves 50 have drainage ducts 51, so that the oil wiped from the piston and collecting in them may drain back to the crank case. The upper main groove can be relied upon to retain a sufficient quantity of oil to lubricate the piston for the very brief interval before the supplemental relief valve comes into operation.

The function of the series of wiper grooves 50, tending to retard and prevent the passage of crank case oil into the combustion chambers, is important at all times but especially when copious supplies of oil are applied just above them, directly to the piston surface. They also help to make it practical to employ a single piston ring. The grooves function in a well known way as a labyrinth in which the flow of lubricating fluid is limited by turbulence or eddy-currents. They also serve the very important purpose of relieving the high tension of the oil film between the piston and cylinder which is set up by the rapid movement of the piston and caused by the high viscosity and the surface tension of the thin films of lubricating oil. This film surface tension or viscosity is in large measure responsible for the leakage of oil around the piston rings and into the combustion chamber since the highly adhesive and viscous oil film is rapidly sucked or forced behind and around the rings on the intake stroke of the piston when low pressures obtain in the combustion chamber.

From the above it will be evident that I prevent excessive leakage of oil into the combustion chamber while providing a copious supply of oil to safeguard against scoring and scuffing of the pistons during the warming up period. In this connection the annular upper groove in the piston wall collects sufficient lubricant to prevent scuffing during the first few strokes of the piston and thereafter my supplemental oil supply line becomes operative and supplies said groove during the relatively long warming up period while the oil is getting fluid enough for proper operation of the splash system.

I claim:—

1. An internal combustion engine, including a cylinder and piston and a pressure feed oiling system for the engine and, in combination with said parts, means for supplying oil about the surface of the piston at a level near but below the lowermost point swept by the top piston ring thereof during periods of excessive oil pressure, and means removing excess of such oil from the piston surface below said ring.

2. An internal combustion engine including a cylinder and piston and a pressure feed oiling system for the engine and, in combination with said parts, means for supplying oil about the surface of the piston at a level near but below the lowermost point swept by the top piston ring thereof during periods of excessive oil pressure, and grooves around the inner surface of the cylinder below the level where the oil is supplied for removing excess of such oil from the piston surface below said ring, draining into the crank case.

3. In an internal combustion engine, the combination with a piston and cylinder and a pressure feed lubricating system, of an oil line adapted to place said system in direct communication with the interior of the cylinder and a pressure operated valve controlling flow of oil through the said line; the interior of said cylinder having means for collecting and draining away the oil from adjacent the point of its inflow into said cylinder.

4. In an internal combustion engine, the combination with a piston and cylinder, and a pressure feed lubricating system including a pump and a relief valve, of an oil line adapted to place the pressure feed system in direct communication with the interior of the cylinder and means associated with the relief valve for controlling such flow; the interior of said cylinder having means for collecting and draining away the oil from adjacent the point of its inflow into said cylinder.

5. In an internal combustion engine, the combination with a piston and cylinder, a pressure feed lubricating system including a pump and a relief valve, of an oil line adapted to place the pressure feed system in direct communication with the interior of the cylinder, said relief valve being adapted to open said oil line only when abnormally high pressures obtain in the lubricating system; the interior of said cylinder having means for collecting and draining away the oil from adjacent the point of its inflow into said cylinder.

6. In an internal combustion engine the combination with a piston and cylinder and a pressure feed lubricating system for the engine including a relief valve and a by-pass from the relief valve to the crank case of the engine, of an oil line adapted to place the by-pass line in communication with the interior of the cylinder and a supplemental relief valve controlling the oil line.

7. In an internal combustion engine the combination with a piston and cylinder and a pressure feed lubricating system for the engine including a relief valve and a by-pass from the relief valve to the crank case of the engine, of an oil line adapted to place the by-pass line in communication with the interior of the cylinder and a supplemental relief valve controlling the oil line, said last mentioned valve being non-operable at pressures sufficient to open the first mentioned relief valve.

8. An internal combustion engine having a pressure feed oiling system and including means for supplying excess oil directly to the side surfaces of the piston during periods of excessive oil pressure, in combination with a cylinder having an annular oil collecting groove therein adapted to wipe oil from a piston sliding in the cylinder and disposed just below the lowest part of the cylinder swept by the uppermost ring of the piston.

9. In an internal combustion engine, a crank shaft, bearings, piston and cylinder, and a pressure feed lubricating system for the bearings, including a pump and an oil line to the bearings having a pressure relief branch adapted to return oil to the pump supply, in combination with a second branch oil line adapted to place said system in communication with the interior of the cylinder, and pressure operated valve means automatically opening to permit escape of oil through said relief branch under normal pump pressures and, at abnormal high pressures, permitting force feed of oil to the interior of the cylinder through said second branch.

10. In an internal combustion engine having a cylinder, a piston and a pressure feed oiling system, means for flooding the surface of the piston at a level slightly below the lowermost point swept by the top piston ring thereof with a copious supply of oil during periods of excessive oil pressure, and means disposed below said oil flooding means for removing the excess oil from the piston surface below said ring.

Signed at Plainfield, in the county of Union and State of New Jersey, this 6th day of October, A. D. 1924.

SAMUEL W. RUSHMORE.